United States Patent
Shao et al.

(10) Patent No.: US 9,112,243 B2
(45) Date of Patent: Aug. 18, 2015

(54) ENERGY STORAGE DEVICES HAVING ANODES CONTAINING MG AND ELECTROLYTES UTILIZED THEREIN

(71) Applicant: BATTELLE MEMORIAL INSTITUTE, Richland, WA (US)

(72) Inventors: Yuyan Shao, Richland, WA (US); Jun Liu, Richland, WA (US)

(73) Assignee: Battelle Memorial Institute, Richland, WA (US)

(*) Notice: Subject to any disclaimer, the term of this patent is extended or adjusted under 35 U.S.C. 154(b) by 147 days.

(21) Appl. No.: 13/858,764

(22) Filed: Apr. 8, 2013

(65) Prior Publication Data
US 2014/0302400 A1    Oct. 9, 2014

(51) Int. Cl.
*H01M 10/0569*    (2010.01)
*H01M 10/054*    (2010.01)
*H01M 10/0568*    (2010.01)

(52) U.S. Cl.
CPC ........ *H01M 10/0569* (2013.01); *H01M 10/054* (2013.01); *H01M 10/0568* (2013.01)

(58) Field of Classification Search
CPC ................ H01M 10/0569; H01M 10/054
USPC .......................................... 429/188, 326, 341
See application file for complete search history.

(56) References Cited

U.S. PATENT DOCUMENTS

| 6,713,212 | B2 | 3/2004 | Aurbach et al. | |
|---|---|---|---|---|
| 2008/0182176 | A1 | 7/2008 | Aurbach et al. | |
| 2008/0226983 | A1* | 9/2008 | Odani et al. | 429/200 |
| 2013/0108919 | A1* | 5/2013 | Matsui | 429/188 |
| 2014/0154592 | A1* | 6/2014 | Mohtadi et al. | 429/344 |

OTHER PUBLICATIONS

Kim, DJ, et al., "Electrochemical properties of magnesium electrolyte with organic solvent," Nov. 23, 2007, pp. 70-73, IOP Publishing, Physica Scripta, Korea.
Aurbach, D, et al., "Electrolyte Solutions for Rechargeable Magnesium Batteries Based on Organomagnesium Chloroaluminate Complexes," Dec. 20, 2001, pp. A115-A121, vol. 149, Journal of Electrochemical Society, Israel.
Mohtadi, R, et al., "Magnesium Borohydride: From Hydrogen Storage to Magnesium Battery," Aug. 21, 2012, pp. 9780-9783, vol. 51, Angewandte Communications, Wiley, Online.

* cited by examiner

*Primary Examiner* — Muhammad Siddiquee
(74) *Attorney, Agent, or Firm* — Klarquist Sparkman, LLP

(57) ABSTRACT

For a metal anode in a battery, the capacity fade is a significant consideration. In energy storage devices having an anode that includes Mg, the cycling stability can be improved by an electrolyte having a first salt, a second salt, and an organic solvent. Examples of the organic solvent include diglyme, triglyme, tetraglyme, or a combination thereof. The first salt can have a magnesium cation and be substantially soluble in the organic solvent. The second salt can enhance the solubility of the first salt and can have a magnesium cation or a lithium cation. The first salt, the second salt, or both have a $BH_4$ anion.

16 Claims, 4 Drawing Sheets

ENERGY STORAGE DEVICES HAVING ANODES CONTAINING MG AND ELECTROLYTES UTILIZED THEREIN

STATEMENT REGARDING FEDERALLY SPONSORED RESEARCH OR DEVELOPMENT

This invention was made with Government support under Contract DE-AC0576RLO1830 awarded by the U.S. Department of Energy. The Government has certain rights in the invention.

BACKGROUND

Low-cost and high-safety battery technologies are critical for both transportation and grid energy storage applications. Significant efforts have been made in the past years to move the energy storage beyond lithium-ion battery technology. Magnesium batteries are one promising technology because of the high volumetric capacity (3832 mAh/cm$^3$ for Mg metal, in comparison 2062 mAh/cm$^3$ for Li metal and 1136 mAh/cm$^3$ for Na metal), improved safety (nondendritic and less chemically active compared to Na and Li metal), and potentially low cost given the natural abundance of Mg.

Traditional electrolytes for Mg batteries made by mixing conventional Mg salts (e.g., Mg(ClO$_4$)$_2$) and traditional solvents (e.g., propylene carbonate) do not typically support reversible plating/stripping of Mg. This is usually attributed to the formation of a solid electrolyte interphase (SEI) layer that does not conduct Mg$^{2+}$ due to the two valence nature of Mg$^{2+}$. Reversible Mg plating/stripping has been observed with some electrolyte compositions, almost all of them in-situ synthesized. However, most of these electrolytes contain highly volatile solvents, such as THF. Furthermore, none of the traditional electrolytes exhibit a sufficiently high cycling stability as measured by the coulombic efficiency—or the capacity fade. Therefore, a need exists for Mg energy storage devices and electrolytes for such devices that exhibit high cycling stability (i.e., little or no capacity fade for Mg plating/stripping).

SUMMARY

This document describes energy storage devices having anodes comprising magnesium as well as electrolytes for such energy storage devices. Capacity fade at the anode can exhibit significantly improved performance in the embodiments described herein compared to current state of the art devices.

In one embodiment, an energy storage device has an anode comprising Mg and an electrolyte solution. The electrolyte solution comprises an organic solvent comprising diglyme, triglyme, tetraglyme, or a combination thereof. A first salt comprising a magnesium cation is substantially dissolved in the organic solvent. The solution further comprises a second salt that enhances the solubility of the first salt and comprises magnesium cation or a lithium cation. The first salt, the second salt, or both comprises a BH$_4$ anion.

As used herein, glyme, diglyme, triglyme, and tetraglyme can refer to dimethoxyethane (DME), diglycol methyl ether, triethylene glycol dimethyl ether, and tetrathylene glycol dimethyl ether, respectively. The term glymes can refer to any of DME, diglyme, triglyme, tetraglyme, or a combination thereof.

In some embodiments, the first salt can comprise Mg(TFSI)$_2$. In others, the first salt comprises Mg(BH$_4$)$_2$. For embodiments in which the first salt comprises the BH$_4$ anion, the second salt can comprise a Bis(Trifluoromethanesulfonyl)Imide (TFSI) anion. Alternatively, the second salt can comprise a PF$_6$ anion.

In preferred embodiments, the device is a rechargeable energy storage device and reversibly plates and strips Mg. The cycling stability of the device can be quantified by the Coulombic efficiency or the capacity fade within a certain number of cycles. In some instances, the anode has a capacity fade less than 80% within 50 cycles. In other instances, the anode has a capacity fade less than 10% within 50 cycles. Preferably, the anode has a capacity fade less than 10% within 100 cycles. Most preferably, the anode has no obvious capacity fade within 100 cycles.

Another embodiment encompasses a rechargeable energy storage device reversibly plating and stripping Mg. The device has an anode capacity fade less than 10% within 100 cycles and comprises a magnesium-containing anode and an electrolyte solution. The electrolyte solution comprises an organic solvent selected from the group consisting of diglyme, triglyme, tetraglyme, and combinations thereof. The solution further comprises a first dissolved salt comprising Mg(BH$_4$)$_2$ and a second dissolved salt selected from the group consisting of LiBH$_4$, LiTFSI, LiPF$_6$, Mg(TFSI)$_2$, Mg(PF$_6$)$_2$, and combinations thereof.

In yet another embodiment, an electrolyte solution for energy storage devices having an anode comprising magnesium comprises an organic solvent, a first salt, and a second salt. The organic solvent comprises diglyme, triglyme, tetraglyme, or combinations thereof. The first salt comprises a magnesium cation and the second salt, which enhances the solubility of the first salt, comprises a magnesium cation or a lithium cation. The first salt, the second salt, or both comprise a BH$_4$ anion.

The purpose of the foregoing summary is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The summary is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

Figure 1A:
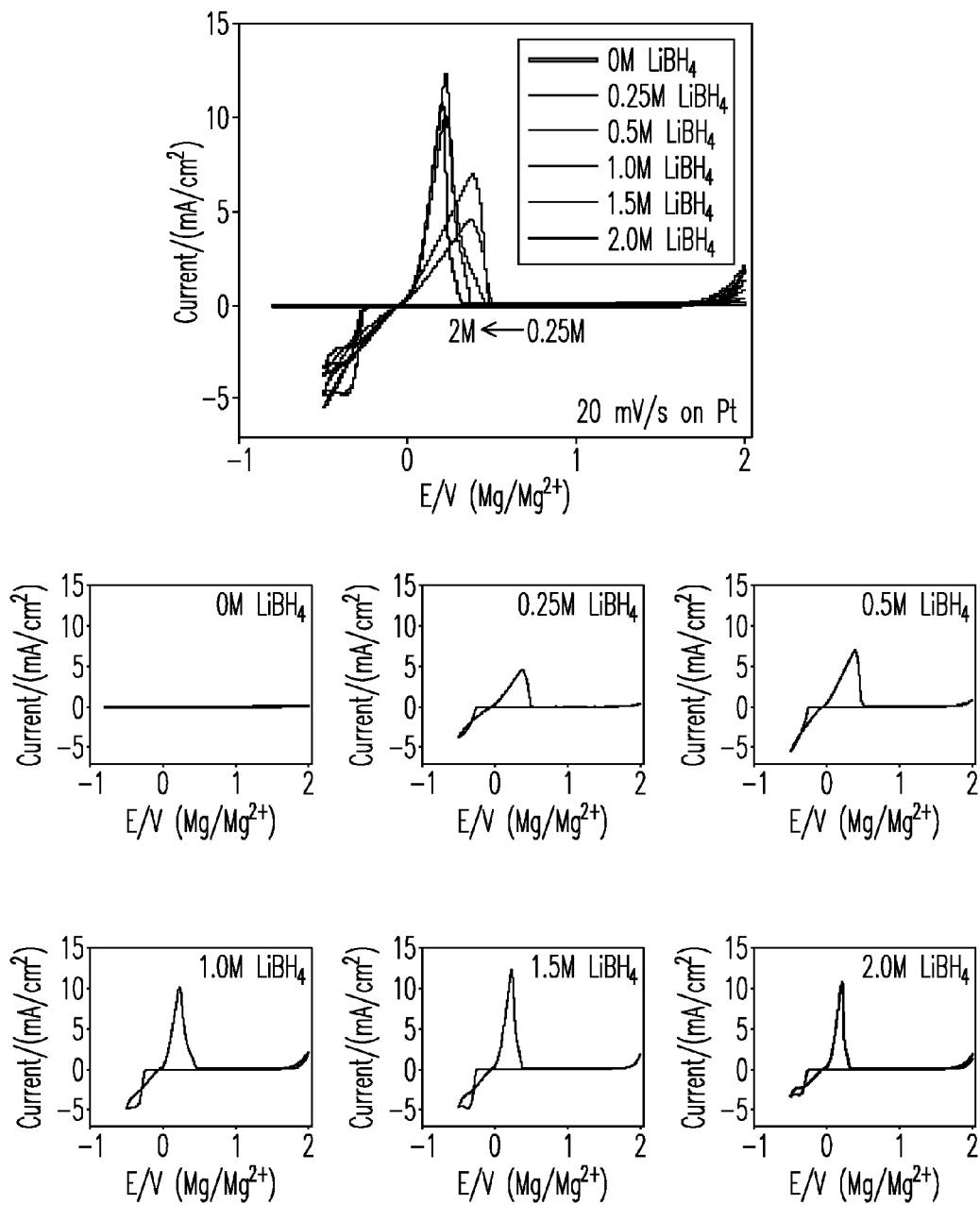
FIG. 1A includes cyclic voltammograms on Pt electrodes in saturated Mg(BH$_4$)$_2$/diglyme with LiBH$_4$ of various concentrations (20 mV/s).

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

For a metal anode in a battery, the capacity fade is a significant consideration/concern. Mohtadi et al. showed that adding $LiBH_4$ could improve/decrease the capacity fade of Mg plating/striping in $Mg(BH_4)_2$-based electrolytes with DME as a solvent (see R. Mohtadi, M. Matsui, T. S. Arthur, S. J. Hwang, Angew. Chem.-Int. Edit. 2012, 51, 9780). However, even including $LiBH_4$ in the electrolyte, the capacity fade of Mg plating/striping was approximately 85% within 30 cycles, which is typically too poor for practical applications. In addition, DME has a boiling point of only 85° C. and is extremely volatile.

Embodiments described herein use diglyme, triglyme, and/or tetraglyme as solvents in addition to a second salt. The solvents above have higher boiling points. For example, diglyme has a boiling point of approximately 162° C. Furthermore, the first salt, second salt, and solvent are selected such that the combination results in unexpected yet significantly improved cycling stability (i.e., very low capacity fade). In many embodiments of the present invention, the Mg capacity fade can be less than 10% over 100 cycles. In other words, the Coulombic efficiency can be as high as substantially 100%.

In the examples and descriptions below, cyclic voltammetry was conducted in a standard three-electrode cell with Mg ribbon as reference/counter electrodes. The working electrodes were Pt wire, glass carbon, or stainless steel 316. The electrolytes were prepared by dissolving $Mg(BH_4)_2$ and $LiBH_4$ in solvents including DME, diglyme, triglyme, and/or tetraglyme. $LiBH_4$ is highly soluble in diglyme, while $Mg(BH_4)_2$ is less so. The solubility of $Mg(BH_4)_2$ in diglyme was measured by adding $Mg(BH_4)_2$ into diglyme little by little. When using $LiBH_4$ as a second salt, which enhances solubility of the $Mg(BH_4)_2$, the solubility is approximately 0.1M. Without the second salt, the solubility of $Mg(BH_4)_2$ in diglyme is approximately 0.01M. Accordingly, in some embodiments, at least one function of the second salt is to enhance the solubility of the first salt.

The electrochemical testing was conducted in an argon filled glovebox with $O_2$ and $H_2O$ below 0.1 ppm. The capacity fade loss was calculated using CE according to the following equation.

capacity fade=1−(CE)$^n$, $n$=cycle number

The coulombic efficiency (CE) was calculated by dividing the charge of Mg stripping over the charge of Mg plating.

Referring to Table 1, various combinations of first salt, second salt, and solvent composing some electrolyte compositions are summarized. The performance of Mg energy storage devices utilizing these electrolytes is also summarized. The table identifies combinations that successfully yield significant reductions in capacity fade. The data summarized in the table indicates that the combinations are unpredictable and that only certain combinations produce the surprising and successful results encompassed by embodiments of the present invention.

TABLE 1

Various combinations of first salt, second salt, and organic solvent are summarized along with the respective capacity fade at a Mg anode after 50 cycles. Trail 1 is cited from Mohtadi et al. (See R. Mohtadi, M. Matsul, T. S. Arthur, S. J. Hwang, Angew, Chem-Int. Edit, 2012, 51, 9780)

| Trial | First Salt | Second Salt | Solvent | Solvent BP | Capacity Fade at Mg Anode |
|---|---|---|---|---|---|
| 1* | $Mg(BH_4)_2$ | $LiBH_4$ | Glyme/DME | 85° C. | 95.5% (CE = 94%) |
| 2 | $Mg(BH_4)_2$ | $LiBH_4$ | Diglyme | 162° C. | 0% (CE = 100%) |
| 4 | $Mg(BH_4)_2$ | Li(TFSI) | Diglyme | 162° C. | 0% (CE = 100%) |
| 5 | $Mg(TFSI)_2$ | $LiBH_4$ | Diglyme | 162° C. | 0% (CE = 100%) |
| 6 | $Mg(BH_4)_2$ | $Mg(TFSI)_2$ | Diglyme | 162° C. | 0% (CE = 100%) |
| 9 | $Mg(BH_4)_2$ | $LiPF_6$ | Diglyme | 162° C. | 0% (CE = 100%) |
| 11 | $Mg(BH_4)_2$ | $LiBH_4$ | Triglyme | 216° C. | 0% (CE = 100%) |
| 13 | $Mg(BH_4)_2$ | $LiBH_4$ | Tetraglyme | 275° C. | 0% (CE = 100%) |

Based on the results of Table 1, the improvements in cycling stability (i.e., reduced capacity fade) are unpredictable. For example, Mohtadi et al. used $Mg(BH_4)_2$ and $LiBH_4$ in DME and the electrolyte resulted in poor cycling stability (i.e., very large capacity fade values). Surprisingly, exchanging the DME solvent with diglyme, according to embodiments described herein, significantly improved the cycling stability (much lower capacity fade, comparing Trials 1 and 2) and resulted in a Coulombic efficiency that is effectively 100%. However, the solvent itself does not account for the improvement. Some trials suggested that while certain solvents can be suitable, the $BH_4$ anion must be present for significantly improved cycling stability, which can be characterized by very low capacity fade values. However, the presence of the $BH_4$ anion alone in apparently suitable solvents is also insufficient improve cycling stability; notevery second salt can enhance cycling stability even if a $BH_4$ anion is present and the solvent comprises diglyme.

Figure 1B:
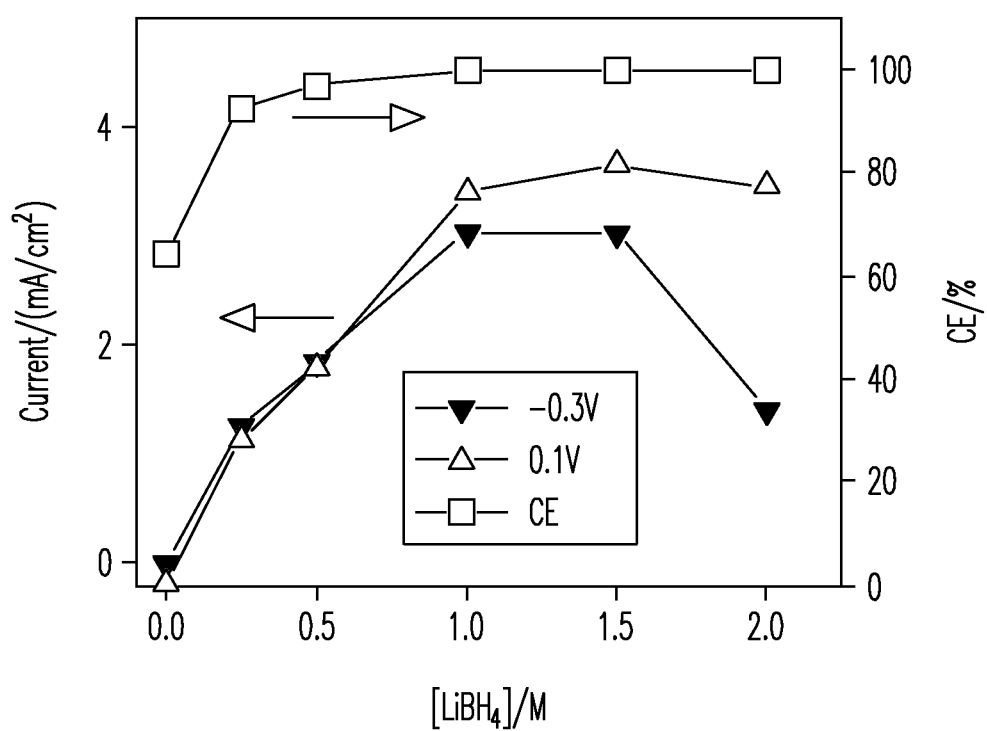
FIG. 1B includes the coulombic efficiency and current density for Mg plating/stripping (data obtained from FIG. 1A).

FIG. 1 shows the cyclic voltammograms (CVs) of one embodiment (Mg plating/stripping) in an electrolyte comprising $Mg(BH_4)_2$ as a first salt and $LiBH_4$ as a second salt in a diglyme solvent. Various $LiBH_4$ concentrations are shown in the figure. The smallest voltage gap between Mg plating and Mg stripping is only ~0.2V (FIG. 1a). With increasing $LiBH_4$ concentration, both the Mg plating curve and the Mg stripping curve shift towards 0 V, and the peaks become narrower (FIG. 1a). This indicates improved reaction kinetics. In FIG. 1b, it is clearly shown that the Mg coulombic efficiency increases from ~60% for the electrolyte without $LiBH_4$, to 93% for the one with 0.25M $LiBH_4$, and to 100% when $LiBH_4$ concentration increases to 1.0M. The CE does not change with scanrates. The current density also increased significantly with $LiBH_4$ concentration with the highest one at [$LiBH_4$]=1.5M (from almost 0 to ~3.5 mA/cm$^2$). This can be attributed to the enhanced dissociation and dissolution of $Mg(BH_4)_2$. With $LiBH_4$, the saturated concentration of $Mg(BH_4)_2$ increases from 0.01M to 0.1M.

Triglyme and tetraglyme solvents in which $Mg(BH_4)_2$ and $LiBH_4$ were dissolved as first and second salts, respectively, can also yield effectively 100% Mg CE (i.e., no observable capacity fade within 100 cycles). However, these triglyme and tetraglyme-based embodiments also exhibited much less current density, probably due to the high viscosity which leads to low conductivity of the electrolytes.

One embodiment comprises an electrolyte saturated with $Mg(BH_4)_2$ and 1.5M $LiBH_4$ in diglyme and is referred to hereinafter as MgLi1.5M(BH)-2G. The MgLi1.5M(BH)-2G shows an electrochemical window of 1.6V on Pt electrode. On glass carbon and stainless steel electrodes, wider electrochemical windows are observable for which anodic stability is pushed to over 2.1V. This is good for using low cost materials.

Figure 2A:
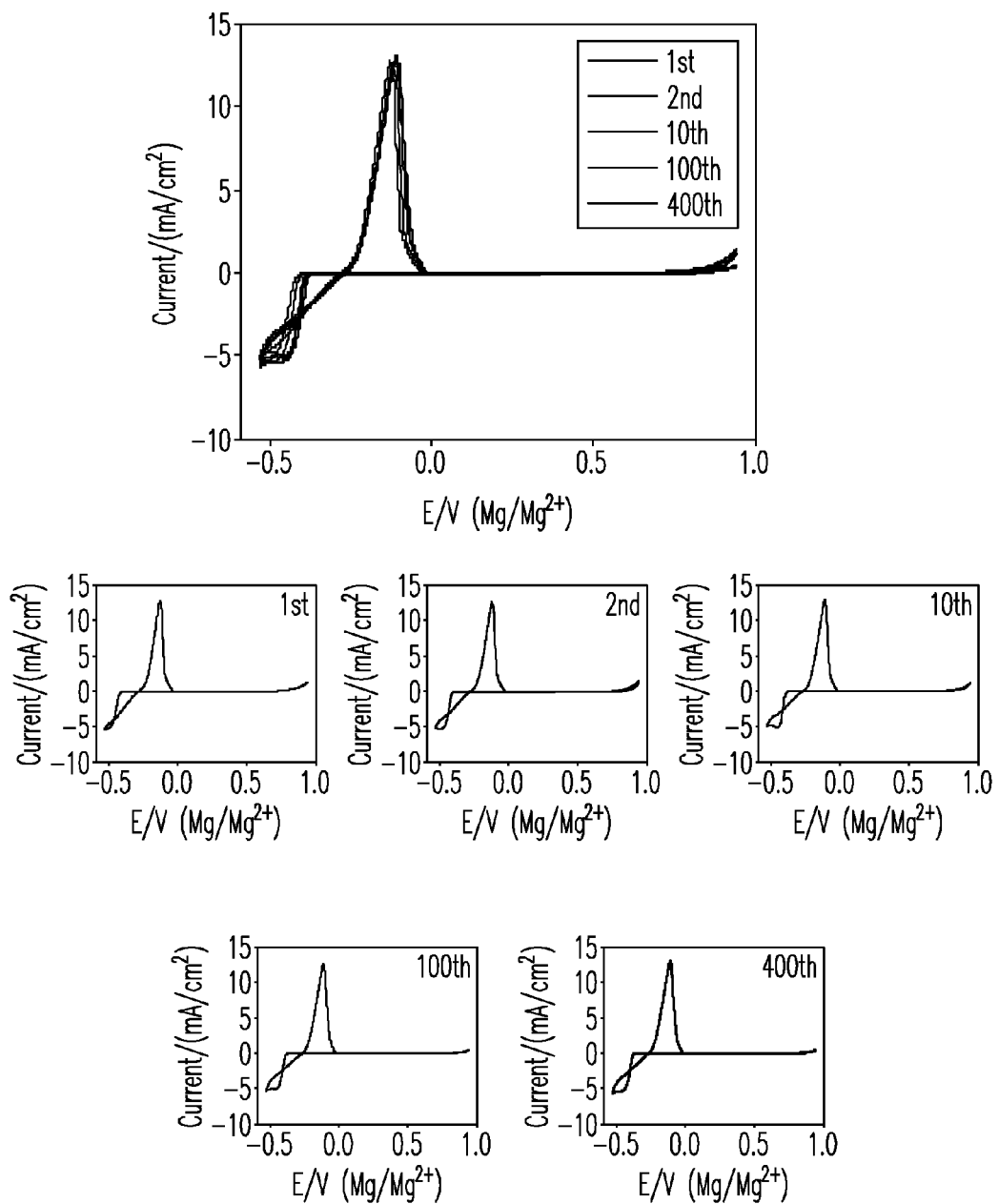
FIG. 2A is a plot of cycling performance of MgLi1.5M (BH)-2G on Pt electrodes.
Figure 2B:
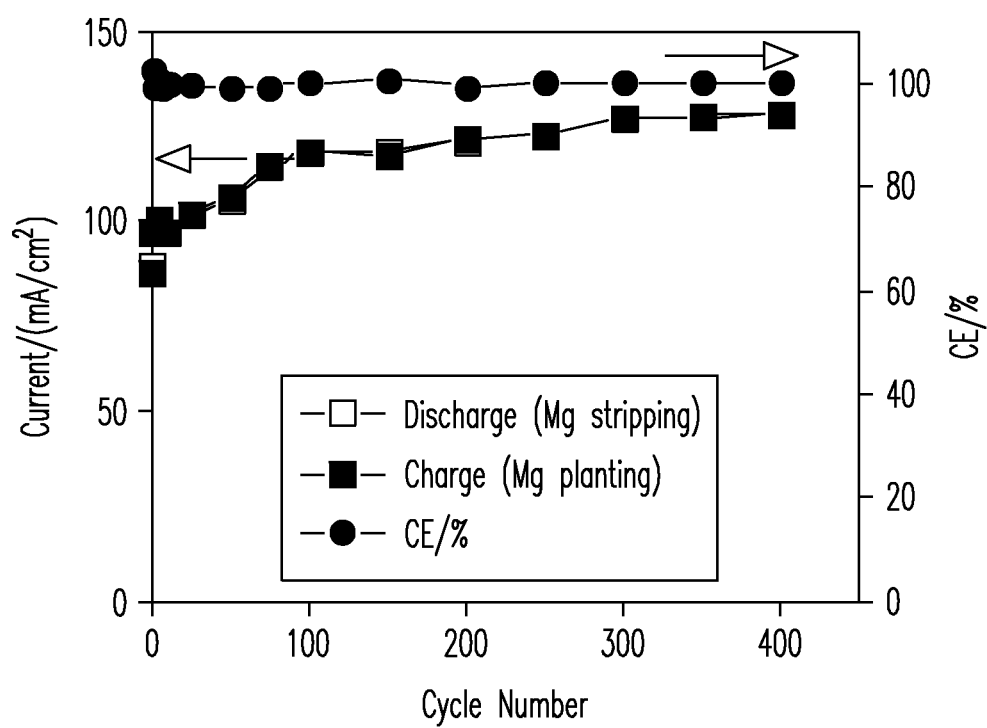
FIG. 2B is a plot of the coulombic efficiency and the charge (capacity) of Mg plating/stripping with cycling (data obtained from FIG. 1a).

FIG. 2 shows the cycling performance in MgLi1.5M(BH)-2G. The Mg plating/stripping curves shift slightly during cycling (FIG. 2a). The Mg coulombic efficiency stays at 100% and the electric charge for Mg plating/stripping, which corresponds to the electrode capacity at such a cycling condition, increases slightly during cycling.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. An energy storage device comprising an anode comprising Mg and an electrolyte solution, the electrolyte solution comprising:
    an organic solvent selected from the group consisting of diglyme, triglyme, tetraglyme, and combinations thereof;
    a first salt substantially dissolved in the organic solvent and comprising a magnesium cation; and
    a second salt substantially dissolved in the organic solvent and comprising a magnesium cation or a lithium cation;
    wherein one of the first salt or the second salt comprises a $BH_4$ anion and the other of the first salt or the second salt comprises a bis(trifluoromethanesulfonyl)imide (TFSI) anion.

2. The energy storage device of claim 1, wherein the first salt comprises $Mg(BH_4)_2$.

3. The energy storage device of claim 1, wherein the first salt comprises $Mg(TFSI)_2$.

4. The energy storage device of claim 1, wherein the anode has a capacity fade less than 80% within 50 cycles.

5. The energy storage device of claim 1, wherein the anode has a capacity fade less than 10% within 50 cycles.

6. The energy storage device of claim 1, wherein the anode has a capacity fade less than 10% within 100 cycles.

7. The energy storage device of claim 1, wherein the anode has no observable capacity fade within 100 cycles.

8. The energy storage device of claim 1, wherein the device is a rechargeable energy storage device reversibly plating and stripping Mg.

9. The energy storage device of claim 1, wherein the second salt is a solubility enhancer for the first salt.

10. A rechargeable energy storage device reversibly plating and stripping Mg, the device comprising:
    an anode comprising magnesium; and
    an electrolyte solution comprising an organic solvent selected from the group consisting of diglyme, triglyme, tetraglyme, and combinations thereof;
    the electrolyte solution further comprising a first substantially dissolved salt comprising $Mg(BH_4)_2$ and a second substantially dissolved salt selected from the group consisting of, LiTFSI, $Mg(TFSI)_2$, and combinations thereof;
    the energy storage device having less than 10% anode capacity fade within 100 cycles.

11. An electrolyte solution for energy storage devices having an anode comprising magnesium, the electrolyte solution comprises:
    an organic solvent comprising diglyme, triglyme, tetraglyme, or combinations thereof;
    a first salt substantially soluble in the organic solvent comprising a magnesium cation; and
    a second salt substantially soluble in the organic solvent and comprising a magnesium cation or a lithium cation;
    wherein one of the first salt or the second salt comprises a $BH_4$ anion and the other of the first salt or the second salt comprises a bis(trifluoromethanesulfonyl)imide (TFSI) anion.

12. The electrolyte solution of claim 11, wherein the first salt comprises $Mg(BH_4)_2$.

13. The electrolyte solution of claim 11, wherein the first salt comprises $Mg(TFSI)_2$.

14. The electrolyte solution of claim 11, wherein the anode has a capacity fade less than 10% over 100 cycles.

15. The electrolyte solution of claim 11, wherein the anode has no observable capacity fade within 100 cycles.

16. The electrolyte solution of claim 11, wherein the second salt is a solubility enhancer for the first salt.

* * * * *

UNITED STATES PATENT AND TRADEMARK OFFICE
CERTIFICATE OF CORRECTION

PATENT NO. : 9,112,243 B2
APPLICATION NO. : 13/858764
DATED : August 18, 2015
INVENTOR(S) : Yuyan Shao et al.

It is certified that error appears in the above-identified patent and that said Letters Patent is hereby corrected as shown below:

In the Claims:
Column 6, line 23, "of, LiTFSI" should read --of LiTFSI--.

Signed and Sealed this
Twenty-third Day of August, 2016

Michelle K. Lee
*Director of the United States Patent and Trademark Office*